S. SYLVESTER.
MECHANICAL MOVEMENT.
APPLICATION FILED NOV. 19, 1914.
1,149,968.
Patented Aug. 10, 1915.
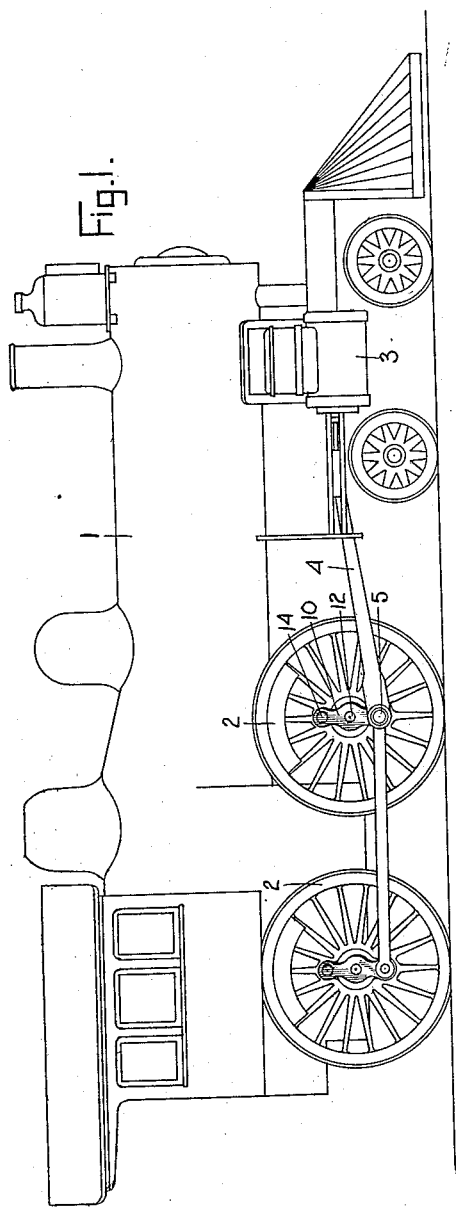
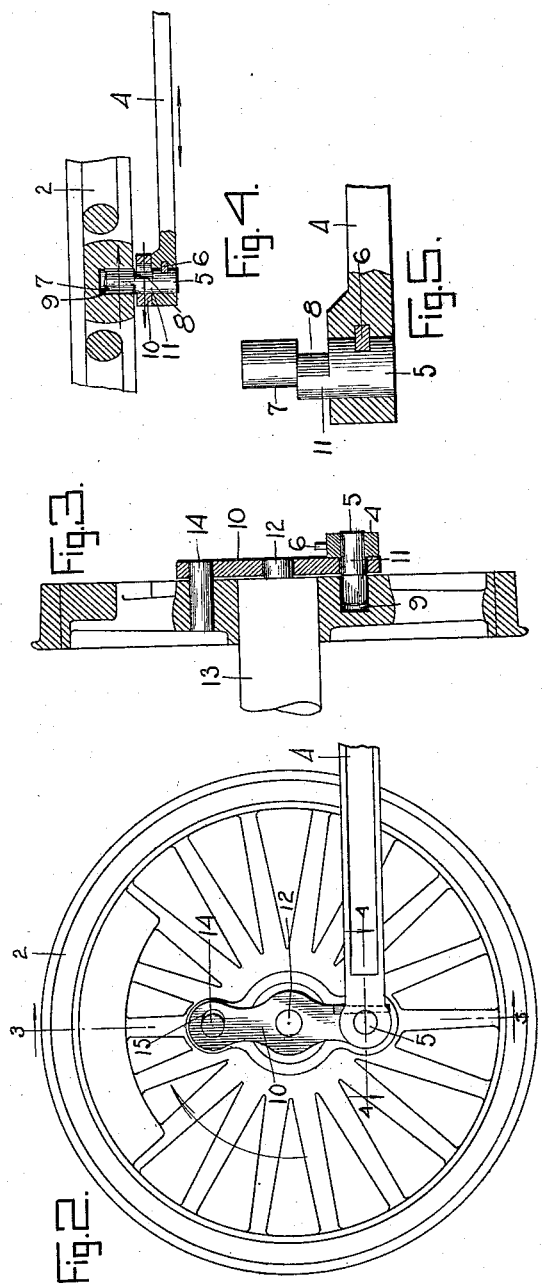
WITNESSES
C. H. Reichenbach.
A. L. Kitchin
INVENTOR
Samuel Sylvester
BY
ATTORNEYS

UNITED STATES PATENT OFFICE.

SAMUEL SYLVESTER, OF LISBON FALLS, MAINE.

MECHANICAL MOVEMENT.

1,149,968.  Specification of Letters Patent.  Patented Aug. 10, 1915.

Application filed November 19, 1914. Serial No. 873,002.

*To all whom it may concern:*

Be it known that I, SAMUEL SYLVESTER, a citizen of the United States, and a resident of Lisbon Falls, in the county of Androscoggin and State of Maine, have invented a new and Improved Mechanical Movement, of which the following is a full, clear, and exact description.

This invention relates to improvements in mechanical movements, and particularly to a movement for translating a reciprocating motion into a rotary motion, and has for an object to provide an improved construction whereby both the thrusts and the pull of the reciprocatory member will act on a traction wheel so as to urge the same forward.

Another object of the invention is to provide an improved power translating mechanism for traction members, as for instance locomotives, so that the rearward thrust of the connecting rod will be transmitted to the driving wheels in such a manner as to move the drive wheels in a forward direction and thereby secure a maximum energy from the amount of steam used.

In the accompanying drawings—Figure 1 is a side view of a locomotive with an embodiment of the invention applied thereto; Fig. 2 is an enlarged side view of a locomotive wheel with an embodiment of the invention applied thereto; Fig. 3 is a section through Fig. 2 on line 3—3; Fig. 4 is a detailed fragmentary sectional view through Fig. 2 on line 4—4; Fig. 5 is an enlarged detailed sectional view through one end of the connecting rod, the wrist pin being shown in connection therewith.

Referring to the accompanying drawings by numerals, 1 indicates an engine of any desired kind having driving wheels 2 of any desired or preferred construction as well as cylinder 3, connecting rod 4 and associated parts all of which may be of any desired or usual construction. Connecting rod 4 carries a pin 5 which is preferably rigidly secured thereto by any desired means, as for instance a key 6. The pin 5 is notched out or cut away at 7 and 8, respectively. The end of the pin carrying notch 7 is fitted into an aperture 9 in wheel 2, the same being preferably round so that when the rod 4 moves to the rear the pin 5 will not engage the wheel 2 but will press against the lever 10 as the rounded section 11 opposite notch 8 will then act upon the lever. Lever 10 is journaled on extension 12 of axle 13, and is provided at the end opposite that accommodating pin 5 with a pin 14 rigidly secured to the car wheel. The aperture 15 in lever 10 is slightly elongated as shown in Fig. 2, while the remaining apertures in the various parts are preferably round. For instance, the aperture 9 in the wheel 2 is round and the aperture in the lever 10 through which pin 5 passes is round, the pin 5 being formed with rounded or cut-away portions 7 and 8 as shown in Figs. 4 and 5 so as to cause the pin to press against wheel 2 when moved in one direction, and to press against lever 10 when moved in the opposite direction. From this it will be seen that when the connecting rod 4 pushes to the rear (assuming the parts to be as shown in Fig. 2) power will be transmitted from rod 4 to lever 10, and from thence through lever 10 to pin 14, and from pin 14 to the upper part of the wheel 2, the extension 12 acting as a fulcrum, and thereby urging or turning the wheel forward. When the connecting rod 14 is in its highest position and is pulled forwardly, pin 5 will press against the wheel 2 opposite the notch 7 or cut-away portion 7 so that the construction will act in the usual manner at this point.

From the construction and arrangement just described, it will be noted that when the rod 4 moves to the front or forwardly in the usual manner, the strain will be on the wheels 2 through pin 5, and when the rod 4 is forced rearwardly the strain will be on pin 5 and lever 10, and from thence to pin 14, the extension 12 acting as a fulcrum, whereby the rearward movement of the rod 4 will cause a forward pressure on the upper part of the wheels 2. In this way a maximum amount of energy created in cylinder 3 will be utilized in moving wheels 2 forwardly.

The invention has been described more particularly in connection with an engine of the locomotive type, but it is to be understood that the invention may be equally applied to mechanical movements of any kind where there is used a traction wheel. It is also understood that slight changes and variations may be made without in any way departing from the spirit of the invention provided the principle of urging the upper part of the wheel forward is maintained.

What I claim is—

1. In a device of the character described, a traction wheel, a substantially reciprocating connecting rod associated therewith, means for driving said connecting rod, a lever pivotally mounted centrally of said traction wheel, a pin extending from one end of said lever into said traction wheel, said pin being cut away on one side so as to act against the traction wheel in one direction, a pin for connecting said connecting rod with said lever, said pin extending through said lever into said traction wheel, said last mentioned pin being on the opposite side of the center of said wheel to said first mentioned pin, said last mentioned pin being cut away on the opposite side to the first mentioned pin so as to act on the wheel when the connecting rod is moving in one direction and to be free when the piston rod is moving in the opposite direction, said piston rod when moving in the opposite direction pressing said lever for causing the first mentioned pin to act on said wheel.

2. In a device of the character described, the combination with a reciprocating power member and a traction wheel, of means for connecting the reciprocating rod and traction wheel, said means comprising a lever pivotally mounted centrally of said traction wheel, a pair of pins arranged an equal distance from the center of said traction wheel, said pins extending into said traction wheel and said lever, one of said pins extending through said lever and into said reciprocating power member, said last mentioned pin being provided with a pair of oppositely arranged notches whereby the power from said power member will be communicated to said lever when the power member is moved in one direction, and will be communicated to said wheel when the power is moving in the opposite direction.

3. In a device of the character described, a traction wheel, a reciprocating power member, a pin rigidly connected with said reciprocating power member, said pin having a notch on opposite sides thereof in different planes, a lever pivotally mounted on said pin in the plane of one of said notches, a traction wheel having an aperture for receiving the end of said pin having the other of said notches, means for pivotally mounting said lever centrally of said traction wheel, and a pin connected with said lever an equal distance diametrically opposite said first mentioned pin, said wheel being provided with an elongated opening for accommodating said last mentioned pin.

4. In a device of the character described, the combination with an engine, of a lever pivotally mounted on an extension of the axle of the driving wheel thereof, said driving wheel having elongated apertures on opposite sides of said axle, a pin extending from each end of said lever into said apertures, one of said pins being connected with the connecting rod of said engine, said last mentioned pin having a pair of notches facing in opposite directions, said notches being in different planes, one of said notches being arranged in the aperture in said traction wheel and the other of said notches being arranged in the end of said lever whereby when said connecting rod is moved in one direction power will be transmitted directly to the traction wheel, and when moved in the other direction will be transmitted to the traction wheel through said lever.

In testimony whereof I have signed my name to this specification in the presence of two subscribing witnesses.

SAMUEL SYLVESTER.

Witnesses:
 ALICE C. NORTON,
 CHARLES E. BAILEY.

Copies of this patent may be obtained for five cents each, by addressing the "Commissioner of Patents, Washington, D. C."